Oct. 14, 1952 S. V. FORGUE 2,614,235

COLOR TELEVISION PICKUP TUBE

Filed April 22, 1950

INVENTOR
Stanley V. Forgue
BY
Roderick Malcolm
ATTORNEY

Patented Oct. 14, 1952 2,614,235

UNITED STATES PATENT OFFICE 2,614,235

COLOR TELEVISION PICKUP TUBE

Stanley V. Forgue, Cranbury, N. J., assignor to Radio Corporation of America, a corporation of Delaware Application April 22, 1950, Serial No. 157,443

14 Claims. (Cl. 315—10)

This invention relates to color television pickup tubes. More particularly, it relates to tubes of a kind which, without being used in groups of more than one, can translate a full color object into a plurality of color video signals.

In the prior art, single pickup tube television cameras have usually required the use of revolving color disks for sequentially inserting different filters in series with their optical systems.

It is an object of this invention to provide a pickup tube which, as the only such tube in a television camera, can translate a full color object into a plurality of color video signals without the use of mechanically moving filters.

A further object is to provide a cathode ray pickup tube of the character above described which can be manufactured in small as well as in large sizes, and at reasonable cost in either case.

It is a further object to provide a tube of the character above described the successful operation of which does not require accurate registry of elements of the scanned raster of the electron beam with elementary subdivisions of a photo-sensitive target.

Another object is to provide a pickup tube of the character described the operation of which is not easily disturbed by stray fields.

In general, the above objects are attained by the use of a target assembly comprising a number of closely-spaced photo-sensitive screens. Each screen is selectively photo-sensitive, i. e., photo-emissive or photo-conductive, to a different color component of the object light. In addition, in some embodiments the selectivity of a given screen is aided by an arrangement in which it receives only a selected component of the object light, i. e., optically filtered light.

Part of any object light reaching the input side of the assembly is intercepted on the first screen, which it reaches while the rest passes through that screen toward the second one. In the case of a three-color tube, this light-sharing process is carried one step further to occur between the second and third screens. Each photo-sensitive target produces a charge-image corresponding to a predetermined color component of the object. These are analyzed by one or more scanning electron beams which penetrate(s) the assembly to the depths of the different screens. In the case of a single beam, it penetrates to the different depths sequentially under electronic switching control. On the other hand, in the case of two or more beams, they are individually allotted to and simultaneously scan the several screens. On each screen the scanning beam will cause the charge-image to be translated into a color video signal.

Figures 1, 2, 7, 8, 9:
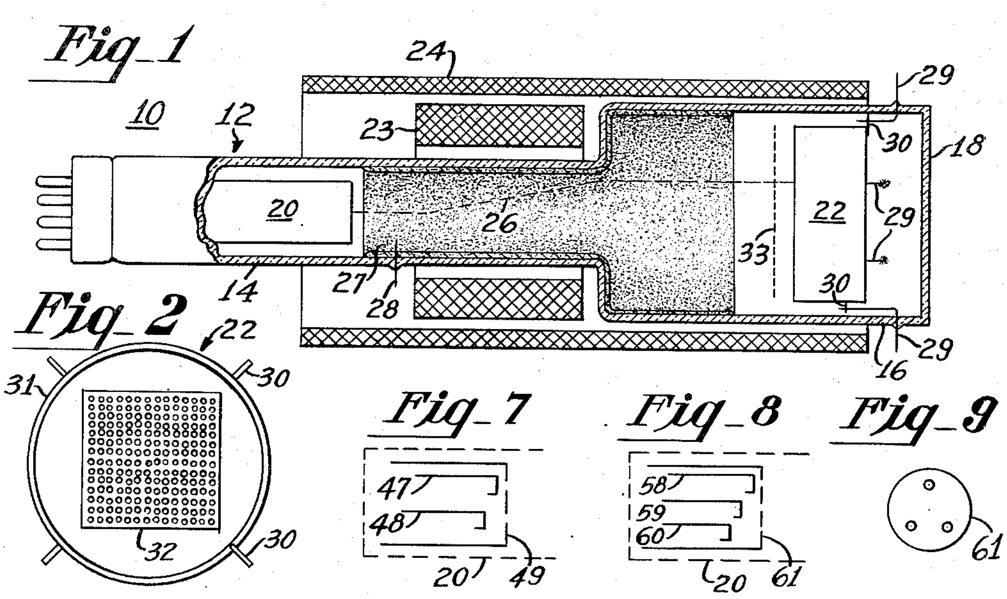
Fig. 1 represents a pickup tube according to the present invention with part of the envelope taken in section.
Fig. 2 is a view of a suitable target assembly for this pickup tube taken from the gun end of the tube.
Figs. 7, 8 and 9 show types of electron guns suitable for the tube shown in Fig. 1.

The camera tube 10 shown in Fig. 1 represents broadly a combination of elements embodying the present invention. It includes an envelope 12 having a neck 14, a bulb 16 and a window 18. An electron gun 20 located in the neck 14 is trained on a target assembly (represented by block 22) which is mounted in the bulb 16 adjacent the window 18. In the operation of the tube 10, object light is directed upon and into the assembly 22 through the window 18.

Electron gun 20 may comprise a single electron beam source or a plurality thereof in a manner to be described below. In the operation of tube 10, a deflection yoke 23 is mounted on the neck 14 adjacent the bulb 16 to provide magnetic deflection of the electron beam in two co-ordinates to produce a picture raster.

Means are provided for causing the final approach of the electron beam to any part of the back surface of the target assembly 22 to be at right angles thereto. This is advantageous in that it causes electrons which reach different parts of the target assembly to have substantially the same forward velocities. In addition, it makes it possible for the beam to penetrate deeply into the assembly through narrow passageways therein whose axes are normal to the back surface of the assembly. The means shown in Fig. 1 is a magnetic focusing coil 24 which produces an axial magnetic flux extending along all of the region of electron travel and somewhat beyond both ends thereof. In this arrangement the beam from the gun 20 will follow paths such as the one represented by dotted line 26.

A conductive coating 27 carried on part of the inner surface of the envelope 12 provides a conventional type of final accelerating anode. In the operation of this pickup tube, a source of direct potential of the order of several hundred volts, e. g., 300 volts, is applied to coating 27 while the cathode of the electron gun 20 is at ground potential. The resulting beam acceleration and the guiding effect of the magnetic field assure the attainment of good focus.

Sometimes it is desirable for the beam to reach the assembly at very low velocities. However, since even in such cases it is advantageous to operate coating 27 at a potential of several hundred volts, means are provided for decelerating the beam just before it impinges on the assembly 22.

Coating 27 is provided with a terminal pin 28 which extends from it through the wall of neck 14. Each of a plurality of thin resilient metal rods 29 has one of its ends sealed through to the outside of the bulb 16 to constitute a terminal pin while its other end (which extends into the bulb) is bent back at right angles to provide a resilient support for the assembly 22. The bent-over end of each rod 29 is connected to a pin 30 extending from one of the electrodes comprised in the target assembly 22.

Most of the electrodes used in any of the embodiments of target assembly 22 consist of large thin plates or grids. Moreover, they are assembled together with very small inter-electrode spacings. Because of the relatively large size of these elements with respect to their small spacings, it is essential that each of them be very flat at all times. However, they are usually not thick enough to retain the desired flatness. Accordingly, each of the electrodes is stretched tautly over a rigid frame in the manner of a drumhead. Reference is made to my co-pending application, Serial No. 145,861, filed February 23, 1950, which is now U. S. Patent #2,590,764, issued March 25, 1952, in which suitable structural arrangements are shown and fully described.

A simpler and less expensive way of mounting a thin flat electrode tautly over a rigid frame has been devised since the filing of my above-mentioned co-pending application. It comprises the following steps: The rigid frame is formed as a simple ring 31, Fig. 2 (rather than as a flanged "short cylinder") of a suitably rigid material having a lower co-efficient of expansion than the sheet material used for the electrode. A suitable combination of materials is mild steel for the ring and super-nickel for the electrode. Such rings can be conveniently formed by cutting them (e. g., on a lathe) from standard seamless steel tubing. The sheet metal electrode, either before or after it has been processed to have a suitable pattern of small apertures, is placed on a flat surface plate; the ring is set upon it in the proper position; a wire of silver solder is laid on the electrode around and adjacent to the periphery of the ring; a heavy flat face plate is laid on top of the ring 31 to force the ring firmly against the super-nickel sheet; and the entire assembly is heated in a hydrogen atomsphere until the silver solder flows into the space between the ring and the super-nickel sheet. Upon cooling, the shrinkage of the super-nickel is greater than that of the mild steel. As a result, the electrode is drawn tautly and maintained flat.

Figures 3, 4, 5, 6:
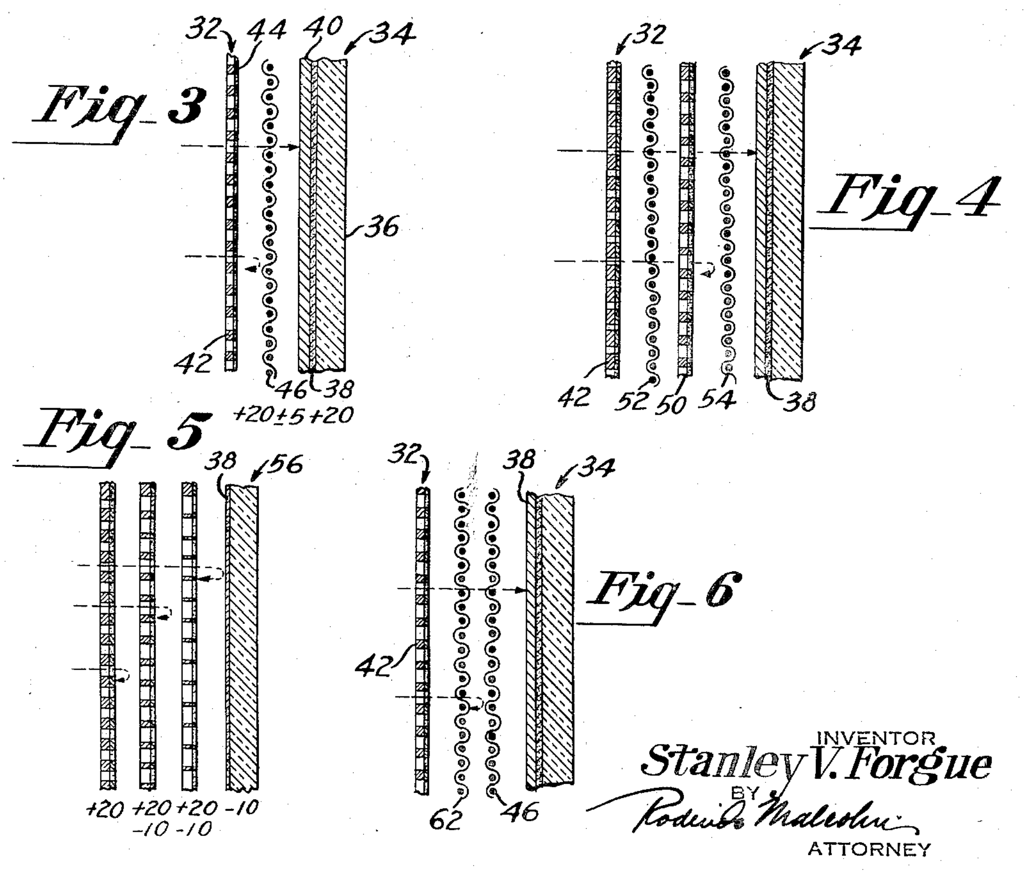
Figs. 3, 4, 5 and 6 are fragmentary cross-sectional views of different types of target assemblies, their dimensions not necessarily being to scale.

Fig. 3 shows a portion of a type of target assembly 22 which may be used in a tube like that shown in Fig. 1 for a two-color television system. It comprises a back photo-sensitive screen represented generally at 32, and a front photo-sensitive screen, similarly represented at 34. The operation of tube 10 does not depend upon these screens having a particular type of photo-sensitivity (as distinguished from their having selective photo-sensitivity). Thus, for example, both of the screens may be photo-conductive; or both may be photo-emissive; or one may be of one type and the other of the other.

In general, a screen which is constructed as shown herein, whether it is of one type or the other, will translate a light image (of the object being picked up) into a charge image. A photo-emissive screen produces a charge image directly. It does so by emitting unequal numbers of electrons from different parts of its surface according to the unequal intensities of the incident light. A photo-conductive screen produces a charge image indirectly. It does so by first producing a pattern of different values of front-to-back conductivity in the active film. As a result, unequal leakage occurs between an initially uniform charge laid down by the beam on one surface (of the film) and a conductive backing plate adjacent to the other surface, whereby the uniform charge is converted into a charge image.

A conductive backing plate which is needed to accomplish the conversion of uniform charge into a charge image in a photo-conductive type of screen is a normal part of screens of either type. This is because in both it has the function of capacitively coupling the charge image to the signal output terminal. As is known, during each scansion the scanning beam wipes out a charge image by either adding or effectively subtracting enough negative charge from each picture element to restore it to a uniform equilibrium potential. A low-velocity beam adds negative charge by depositing primary electrons on the screen. A high-velocity beam "subtracts" negative charge by causing secondary emission from the screen. The resulting small increments of current to or from the beam side of the screen are capacitively coupled to the signal output terminal by its backing plate.

The front screen 34 must be able to transmit as much light as possible to the back screen(s) but it does not have to be permeable to the electron beam. Accordingly, its supporting structure consists of a transparent solid plate, glass plate 36. The backing plate for the front screen 34 is a transparent conductive coating 38, such as a coating of the material known as "Nesa" which is produced by The Pittsburgh Plate Glass Co., Pittsburgh, Pa., which is carried on the glass plate 36 on its side toward the electron gun 20. A coating of photo-sensitive material 40 is carried on top of the transparent conductive coating 38. Conversely to the front screen 34, the back screen 32 does not have to be able to transmit light but does have to be permeable to the electron beam. Accordingly, the supporting structure for back screen 32 consists of a thin foraminous metal plate 42. Its many closely-spaced apertures provide the required permeability to the electron beam; the unapertured portion of its front surface provides a foundation for the active coating; and, since it is made of metal, this plate itself acts as the required conductive backing plate. A photo-sensitive coating 44 is carried on the front surface of the plate 42. A color-switching control grid 46 is insulatingly carried in the assembly 22 between the back and front photo-sensitive screens.

In one way of analyzing (or "reading") a charge image, the screen on which it is formed is scanned with a low-velocity beam. To so operate a pickup tube having a target assembly 22 like that shown in Fig. 3, the backing plate of each of the two photo-sensitive screens is polarized at a direct potential slightly above that of the electron gun cathode, for example, 20 volts higher. Since the final anode coating 27 is maintained at a much higher potential, i. e., at about 300 volts or so, the potential gradient from the back screen 32 to the field-free space within the final accelerating anode 27 will act as a retarding field to decelerate the beam before it enters the target assembly. This retarding field incidentally affords a final large-diameter positive electron optic. Therefore, if desired, it may be utilized in some embodiments in place of the magnet 24 as a beam-normalizing means. Moreover, one or more low voltage screens 33 may be mounted between the final accelerating anode and the target assembly which may be polarized at a potential intermediate the respective potentials of this anode and the surface of the assembly nearest to it to serve as a means for pre-decelerating the beam and controlling the configurations of the equipotential surfaces set up between the assembly 22 and the coating 27.

With the screens 32, 34 polarized at about the cathode potential, sequential color switching is easily effected with alternating pulses having peak-to-peak magnitudes of the order of five or ten volts. During each positive pulse, the beam passes through the grid 46 to the front screen 34 and during each negative pulse it is reflected back to the back screen 32.

If desired, this tube can be utilized in a simultaneous form of operation. This may be done by including two cathodes in the single gun 20, as shown at 47 and 48 in Fig. 7, or providing an equal number of cathodes as respective parts of separate complete guns. If one of the cathodes is polarized at slightly above the potential of the color-switching grid 46 and the other at a potential slightly below, one of the beams is continuously reflected to the back screen 32 and the other continuously passes through to the front screen 34. In this way, both electron images will be analyzed simultaneously.

In the gun shown in Fig. 7, the two cathodes 47, 48 have a common control grid 49. It is inherent in this arrangement that in the operation of the tube each of the two cathodes has a different bias with respect to the common grid. Because of this, different spacings are used between the grid 49 and the respective cathodes. As a result, the two beams have substantially equal currents despite the unequal biases.

Each of the coatings 40, 44, should be of material which is selectively responsive to a different complementary portion of the visible light spectrum. Red selenium is a photo-conductor which is particularly appropriate for the coating 40 since it happens to have both selective photosensitivity and a useful optical filtering effect. In addition to responding selectively to light in the blue-green end of the visible spectrum, it also attenuates it, i. e., filters it out. Therefore, when it is used on the front screen, only light components in the red end of the spectrum can reach the back screen 32. This improves the degree of color separation which can be attained with this tube. Obviously, the possibility of further such improvements will increase as materials are developed which have even a better combination of selective light responsiveness and selective light transmission.

In Fig. 4 there is shown an arrangement for assembly 22 which is suitable for a three-color system. It comprises front and back photo-sensitive screens 34 and 32 which structurally are similar to the corresponding screens of the Fig. 3 assembly. However, in this target, each photo-sensitive coating is selectively responsive to a smaller portion of the visible spectrum, i. e., ideally to about one-third instead of one-half thereof. The third screen in the Fig. 4 embodiment is an intermediate screen 50 which is carried in the assembly 22 about midway between the front and back screens. Ideally, this screen should have both good light transmission and permeability to the beam. Since it is difficult to make a sufficiently strong screen of transparent material, such as glass, which is at the same time either foraminous enough or thin enough to be permeable to the beam, this screen is made of metal, like the back screen 32, but with a larger ratio of apertured to unapertured surface. Between each pair of adjacent screens there is a color-switching control grid, 52 and 54 respectively, like the grid 46 of Fig. 3.

The foraminous plates for the back and intermediate screens 32 and 50 may be formed of thin copper or supernickel sheet by a photo-engraving-and-etching process comprising the following steps: An exact replica of the screen is first drawn with pen and ink (it is permissible to do this on a scale very much larger than one-to-one and to obtain a photographically reduced facsimile, if it will be helpful for attaining precision); the thin copper sheet is coated with a photo-sensitive material which hardens on exposure to light; a negative light-image of the replica is projected onto the copper sheet; the unhardened portions of the photo-sensitive material are washed away, and the copper sheet is etched through in the places exposed by the washing.

Preferably, the control grids are made of fine woven wire mesh, or some equivalent thereof which affords as large a ratio of apertured-to-unapertured structure as is commensurate with operativeness as a control electrode and with the tensile strength needed to maintain tautness. The grids may be sputtered with gold to reduce any tendency to secondary emissiveness.

Suitable transmission percentages for the two foraminous metal screens are between fifty and sixty percent for the intermediate screen and about forty percent for the back screen. Preferably, the same number of apertures is used in each of these screens. Moreover, preferably these apertures should be positioned in identical patterns so that it is possible for each and every aperture of one plate to be substantially aligned with a corresponding aperture of the other. With such alignment, substantially all of the beam electrons which pass through a particular aperture of the back screen are free to pass through a corresponding (and larger) aperture of the intermediate screen unless they are purposely stopped by the back control grid 52.

In arrangements of the kind shown herein, it is not difficult to form the photo-sensitive coatings since each of them consists of a uniform coating laid down over all of one side of a supporting surface. This is simpler than an arrangement using a single complex coating comprising a very large number of small dot- or line-like elements arranged in a precise predetermined pattern on a common image surface.

As a result, this tube can be made in small sizes with small diameter screens.

To obtain satisfactory operation, it is not necessary to use any particular photo-sensitive material as long as some appropriate material is used which renders a given screen capable of the desired selective photo-sensitivity. The following coating materials have been found suitable and therefore are mentioned herein by way of example only:

PHOTO-EMISSIVE

| Coating Material | Portion of the Spectrum in which it is Peaked |
|---|---|
| Silver Cesium | Red. |
| Antimony Cesium | Blue. |
| Bismuth Cesium | Green. |

PHOTO-CONDUCTIVE

| | |
|---|---|
| Antimony Trisulfide | Red. |
| Red Selenium | Blue. |
| Zinc Selenide | Do. |
| Cadmium Sulfide | Green. |

As is known, it is customary in the case of photo-emissive screens to use a thin insulating separator (such as mica) between the active photo-emitter and the backing plate to provide a highly insulating carrier for the charge image and to reduce the capacity of the screen. Accordingly, the photo-sensitive coatings shown in Figs. 3–6 herein, such as coatings 40 and 44, may be considered as representing both the separator and the photo-emissive material which it insulates from the backing plate.

The exact structures of the screens or the exact processes by which they are made are not part of the present invention, but may be chosen from abundant known art relating thereto.

As pointed out above, the optical filtering effect of the front screen may aid the selective responsiveness of the back screen(s). However, it is possible that occasionally a very desirable screen material for the front screen will prove to have an adverse filtering effect. The arrangement shown in Fig. 5 is suitable for avoiding the difficulty which this will present. In Fig. 5, all of the photo-sensitive targets are carried on foraminous metal backing plates. These plates as they occur in succession from the back to the front of the assembly have progressively higher percentages of light transmission. However, in this case, the light reaching the two back screens does not actually pass through a layer of photo-sensitive material on the front screen but rather through open holes therein. This permits a sharing between the screens of unfiltered light from the full-color object. Accordingly, in a target assembly as in Fig. 5, the electrode nearest to the window 18 is simply a conductive transparent plate 56, e. g., a glass plate with a Nesa coating on its back surface. The assembly shown in Fig. 5 does not include any switching control grids. This is possible because in one way of operating the tube the electron velocities within the assembly are low enough so that the targets themselves may be used as switching electrodes. Thus any screen may be made to act as both a target and a switching electrode by driving it between a positive value, at which it receives the scanning beam at an appropriate "reading" velocity, and a negative value, at which it will reflect the beam back to the screen next behind it. It will be observed that in this arrangement the back screen need not have any switching potential applied to it inasmuch as it never acts to turn back the beam. On the other hand, switching voltages should be applied to the conductive plate 56 at times when it is desired to turn back the beam upon the photo-sensitive screen nearest to the front of the assembly.

It is possible to obtain simultaneous operation of a tube having a target assembly of this type by using three electron guns or a three-cathode electron gun such as that shown in Figs. 8 and 9. The cathodes 58, 59 and 60 are biased to slightly different potentials with respect to a common grid 61 so that each beam will penetrate the target assembly 22 to a different depth (at which it will be turned back upon the foraminous screen through which it last passed). These cathodes are positioned at unequal distances from grid 61 for reasons explained above.

The grid 46 of Fig. 3 or the grids 52, 54 of Fig. 4 may be eliminated if it is desired to operate by applying switching voltages directly to appropriate photo-sensitive screens in the manner explained above with respect to Fig. 5.

In operating a pickup tube 10 of the photo-conductive type with a low-velocity scanning beam (or beams), the following path of electron flow is established: from the gun 20 to the active surfaces of the screens to lay down uniform charges thereon; from the active surfaces of the screens to their backing plates to transform the uniform charges into charge images; and from the backing plate through a utilization circuit and the D. C. power supply back to the gun 20. This type of operation of this type of tube does not involve either primary or secondary emission from the screens and therefore does not require any means for collecting any such electrons. However, in other cases, some means must exist or some provision must be made for collecting emitted primary or secondary electrons. For example, in the operation of a tube using photo-emissive screens, the photo-electrons which are emitted while the charge images are being formed must be collected. If desired, special collector electrodes may be included in the target assembly for this purpose. However, satisfactory operation can be obtained without them as follows: When the switching control grid 46 is positive, i. e., during intervals when the beam is scanning the front screen, it can be driven positive enough so that photo-electrons from both screens will be collected on it. Thus, in element-sequential operation, the switching screen will be able to collect photo-electrons for at least half of the exposure time during which the charge image is built up. At other times, photo-electrons emitted by the back screen 32 of Fig. 3 will "see" some positive field from coating 27 which will fringe through the openings of this screen, and photo-electrons from the front screen 34 will "see" some positive field which fringes through the openings of the switching control grid 46 from the back screen 32.

In the cases of high-velocity operation of either photo-emissive or photo-conductive types of tube, it is possible that the secondary electrons will be collected in the same way. However, it is preferable to provide special collector electrodes. Consider the case of high-velocity operation of a photo-conductive type of tube. In such a case, the "uniform charge" from which the charge image is derived will assume a potential level (an "equilibrium potential") equal to that of some tube structure which is near to the screen in question and collects its secondaries. For best results, a structure should be employed which will offer a uniform collecting field and therefore will result in the "uniform charge" being as truly uniform as possible. Appropriate structure for this purpose is shown in Fig. 6.

Fig. 6 is a target assembly very much like that shown in Fig. 3. Because of this, certain elements of this assembly which correspond to and are in all respects identical to similar elements shown in Fig. 3, bear the same reference numerals. In addition, this assembly includes a collector electrode 62. In the operation of a tube having this type of target assembly, the collector electrode is maintained at a potential above "first cross-over" with respect to the electron gun cathode and somewhat higher than the backing plates of the photo-sensitive screens, in particular, higher than that of the plate 42. This will result in good collection from the back screen. The switching control grid 46 is switched from a positive potential about equal to that of the collector screen to a negative potential slightly under that of the cathode.

If the color switching rate is very much higher than the field repetition rate, e. g., in element or "dot" sequential operation, the switching grid will quite successfully collect emission from the front screen. However, to improve over this, or to better adapt the tube to lower switching rates or to simultaneous operation, another collector electrode may be added to the assembly in the space between the switching control grid and the front screen.

In simultaneous operation of any of the embodiments shown herein, each switching control grid is polarized at a direct potential which is near to the average potentials of the two or more cathodes to decelerate all of the beams but more specifically is above that of any beam which it is to pass and below that of any beam which it is to reflect.

While the assembly of Fig. 6 is especially suited to collecting secondary electrons in high-velocity operation for either photo-conductive or photo-emissive types of tube, it can also be used to collect the photo-electrons which are emitted by tubes of the latter type in either type of operation.

In sequential operation of a picture tube according to the present invention, it will be possible to use electronic switching in the respective circuits between each of the screens and the common input of a video amplifier to prevent unwanted electrons, such as secondaries collected on an intermediate screen, during the reading of the front screen, from getting into the amplifier.

It is possible to operate a photo-conductive pickup tube employing a target assembly of the kind shown in Fig. 6 with the electrode 62 polarized at a potential which (while it is above first "cross-over" with respect to the cathode), is somewhat lower than that of the backing plates for the screens 32, 34. This will result in a high-velocity form of operation in which the secondary emission from the screens is actually not collected by the electrode 62 but instead repelled back onto the screen(s) by it. This is sometimes referred to as high-velocity operation with an effective secondary emission ratio of less than one (1). It is also referred to as high-velocity "positive" operation, this terminology having reference to the positive potential of a backing plate relative to a collector. In this operation, electrode 62 has the single function of controlling the uniformity of the charge laid down on the target(s) by the beam, instead of the two functions (involved in high-velocity negative operation) of controlling the uniformity of this charge and of causing it to be positive with respect to the cathode.

I claim:

1. A cathode ray device comprising an evacuated envelope, within the envelope a group of parallel, closely-spaced photo-sensitive screens in registry with each other and including at least a front screen and a back screen, a window in said envelope through which object light may be directed upon said front screen and toward said back screen, each of said screens from the front screen up to the back screen having substantial light transmission, whereby some of the object light so directed will reach each of them, each of the screens including a supporting plate having a coating of photo-sensitive material on its light-receiving side, electron gun means directed toward one side of the group of screens, and each of said plates which lies between said gun and one of said coatings being multi-apertured whereby it is a foraminous structure permitting electrons from said gun to reach said coating.

2. A cathode ray device as in claim 1 in which the supporting plate for said front screen is a transparent solid plate.

3. A cathode ray device as in claim 2 and in which the coating material of said front screen is selectively most sensitive to light in one portion of the visible light spectrum and has its highest light transmission to light in another portion thereof.

4. A cathode ray device comprising an evacuated envelope, within the envelope a group of parallel, closely-spaced photo-sensitive screens in registry with each other and including at least a front screen and a back screen, a window in said envelope through which object light may be directed upon said front screen and toward said back screen, each of said screens from the front screen up to the back screen having substantial light transmission whereby some of the object light so directed will reach each of them, each of the screens including a supporting plate having a coating of material on its light-receiving side which is photo-sensitive to light in a different portion of the spectrum, electron gun means directed toward one side of the group of screens, and each of said plates which lies between said gun and one of said coatings being foraminous to permit electrons from said gun to reach said coating.

5. A cathode ray device as in claim 2 in which the coating material for at least one of said screens is photo-conductive.

6. A cathode ray device as in claim 2 in which the coating material for at least one of said screens is photo-emissive.

7. A cathode ray device including an envelope having electron gun means therein for projecting at least one beam of electrons toward a target region within the envelope and within said region a plurality of electrodes positioned in the path of said beam and including, in succession, a foraminous screen electrode having a photo-sensitive coating on its surface oppositely disposed from said gun means, a switching control electrode adjacent the coated side of said screen electrode, and a photo-sensitive screen adjacent to said control electrode on its other side from said screen electrode.

8. A cathode ray device including an envelope having electron gun means therein for projecting at least one beam of electrons toward a target region within the envelope and within said region a plurality of electrodes positioned in the path of said beam and including a foraminous screen electrode having a photo-sensitive coating on its surface oppositely disposed from said gun means, a transparent solid plate in substantially parallel relationship to said foraminous electrode and having a photo-sensitive coating on its side facing said first-mentioned photo-sensitive coating, and a plurality of grids between said screen electrode and said photo-sensitive screen, said grids including a switching control grid and at least one collector grid.

9. A cathode ray device including an envelope having electron gun means therein for projecting at least one beam of electrons toward a target region within the envelope through a deflecting region extending over a portion of the space between the gun means and the target region, magnetic means for producing a flux field with substantially parallel flux lines extending in directions parallel to the mean path of the beam from said gun means to said target region, said flux field extending between said target region to control the direction of a beam moving therein, and a plurality of electrodes positioned in the path of said beam and including in succession a foraminous screen electrode having a photo-sensitive coating on its surface oppositely disposed from said gun means, a switching control electrode adjacent the coated side of said screen electrode and a photo-sensitive screen adjacent to said control electrode on its other side from said screen electrode.

10. A cathode ray device including an envelope having electron gun means therein for projecting at least one beam of electrons toward a target region within the envelope and within said region a plurality of electrodes positioned in the path of said beam and including a group of at least two foraminous screen electrodes each having a photo-sensitive coating on its surface oppositely disposed from said gun means. a switching control electrode adjacent the coated side of each of said screen electrodes, and a photo-sensitive screen adjacent to said switching electrode on the side of said group of screens farthest from said gun means.

11. A cathode ray device as in claim 10 in which said electron gun means comprises one more cathode than the number of said foraminous screen electrodes in an arrangement in the gun means which is adapted to project a different beam of electrons into the target region to a different predetermined depth when each of the switching electrodes is polarized at a predetermined direct potential.

12. A cathode ray device including an envelope having electron gun means therein for projecting at least one beam of electrons toward a target region within the envelope and within said region a plurality of electrodes positioned in the path of said beam and including a group of at least two foraminous screen electrodes each having a photo-sensitive coating on its surface oppositely disposed from said gun means, a switching control electrode for each screen electrode adjacent to the side thereof away from said gun means, and a transparent conductive plate adjacent the coated side of the screen electrode on the side of said group farthest from said gun means.

13. A cathode ray device including an envelope having electron gun means for projecting at least one beam of electrons toward a target assembly mounted within the envelope and comprising a plurality of target electrodes positioned in the path of said beam, a final beam-accelerating electrode between said gun means and said target assembly and an electron transparent beam decelerating electrode positioned in the path of said beam between said accelerating electrode and said assembly for pre-decelerating the beam of electrons and for controlling the configurations of a equipotential surfaces set up between said final beam-accelerating electrode and the surface of said assembly nearest to it when the former is polarized at a more positive potential than the latter, said plurality of electrodes including in succession a foraminous screen electrode having a photo-sensitive coating on its surface oppositely disposed from said gun means, a switching electrode adjacent the coated side of said screen electrode and a photo-sensitive screen adjacent to said switching electrode on its other side from said screen electrode.

14. A cathode ray device comprising an evacuated envelope containing an electron gun means having at least one small-area emissive source of electrons, a photo-sensitive screen including a foraminous supporting plate with one of its surfaces positioned to receive electrons projected from said gun means, and a coating of photosensitive material over its other side, a grid positioned in front of said coating for reflecting back upon it electrons which are projected through any aperture of said supporting plate while, in the operation of the device, the potential of said electrode has a predetermined relationship to that of a source of electrons of said gun and another photo-sensitive screen adjacent to said electrode to receive electrons which have passed through apertures of said supporting plate and also through said grid.

STANLEY V. FORGUE.

REFERENCES CITED

The following references are of record in the file of this patent:

UNITED STATES PATENTS

| Number | Name | Date |
|---|---|---|
| 2,259,506 | Young et al. | Oct. 21, 1941 |
| 2,259,507 | Iams | Oct. 21, 1941 |
| 2,267,823 | Goldmark | Dec. 30, 1941 |
| 2,532,511 | Okolicsanyi | Dec. 5, 1950 |